United States Patent
Inayama et al.

(10) Patent No.: US 10,277,784 B2
(45) Date of Patent: Apr. 30, 2019

(54) CAMERA IMAGING DEVICE FOR A VEHICLE

(71) Applicant: KABUSHIKI KAISHA TOKAI-RIKA-DENKI-SEISAKUSHO, Aichi-ken (JP)

(72) Inventors: Masahide Inayama, Aichi-ken (JP); Toshinari Nakai, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 108 days.

(21) Appl. No.: 15/241,571

(22) Filed: Aug. 19, 2016

(65) Prior Publication Data

US 2017/0064163 A1   Mar. 2, 2017

(30) Foreign Application Priority Data

Aug. 27, 2015   (JP) .................................. 2015-168116

(51) Int. Cl.
  *H04N 5/225*   (2006.01)
  *B60R 11/04*   (2006.01)
  *B60R 11/00*   (2006.01)

(52) U.S. Cl.
  CPC ........... *H04N 5/2252* (2013.01); *B60R 11/04* (2013.01); *H04N 5/2257* (2013.01); *B60R 2011/004* (2013.01); *B60R 2011/0085* (2013.01)

(58) Field of Classification Search
  CPC ...... B60R 2011/004; B60R 2011/0085; H04N 5/2252; H04N 5/2257
  See application file for complete search history.

(56) References Cited

U.S. PATENT DOCUMENTS

| 2003/0103142 A1* | 6/2003 | Hitomi | B60R 1/074 348/148 |
| 2003/0169160 A1* | 9/2003 | Rodriguez Barros | B60Q 1/2665 340/426.1 |
| 2003/0183413 A1* | 10/2003 | Kato | B60R 16/0215 174/135 |

(Continued)

FOREIGN PATENT DOCUMENTS

| DE | 102006054120 A1 | 5/2008 |
| EP | 1529688 A1 | 5/2005 |
| JP | S6225241 U | 2/1987 |

(Continued)

OTHER PUBLICATIONS

Extended European Search Report issued in the corresponding EP application No. 16185265.2 dated Jan. 20, 2017.

*Primary Examiner* — Kaitlin A Retallick
(74) *Attorney, Agent, or Firm* — Roberts Mlotkowski Safran Cole & Calderon, P.C.

(57) ABSTRACT

In an imaging device, a bracket and a camera are capable of rotating with respect to a base, and harnesses are routed inside an inner supporting tube of the base. A covering frame of a harness cover covers an upper end portion of the inner supporting tube, the harness is abutted on the covering frame, and the covering frame is capable of rotating integrally with the bracket. This enables the harnesses to be suppressed from sliding on the covering frame and enables load input to the harnesses to be suppressed when the bracket is rotated, even though the harness is press-contacted to the covering frame.

14 Claims, 5 Drawing Sheets

(56) References Cited

U.S. PATENT DOCUMENTS

2005/0248863 A1   11/2005   Kawanishi

FOREIGN PATENT DOCUMENTS

| JP | 2005319907 A | 11/2005 |
| JP | 2006248369 A | 9/2006 |
| JP | 2014231334 A | 12/2014 |

* cited by examiner

CAMERA IMAGING DEVICE FOR A VEHICLE

CROSS-REFERENCE TO RELATED APPLICATION

This application claims priority under 35 USC 119 from Japanese Patent Application No. 2015-168116 filed Aug. 27, 2015, the disclosure of which is incorporated by reference herein.

BACKGROUND

Field of the Invention

The present disclosure relates to an imaging device including an imaging unit that is supported by a supporting body so as to be capable of rotating.

Related Art

In a vehicle side camera device described in Japanese Patent Application Laid-Open (JP-A) No. 2014-231334, a camera is supported by a shaft so as to be capable of rotating, and the shaft and the camera are housed inside a cover member. It is to be inferred that a harness from the camera is inserted inside the shaft since the shaft has a tube shaped.

Note that, if a gap between an upper end of the shaft and an upper wall of the cover member is made smaller in this vehicle side camera device in order to be more compact in the up-down direction, the harness is press at the upper end of the shaft. Thus, the harness slides against the upper end of the shaft and a load is input to the harness when the camera is rotated.

SUMMARY

In consideration of the above circumstances, the present disclosure obtains an imaging device capable of suppressing load from being input to wiring.

An imaging device of a first aspect includes: a supporting body that is provided at a vehicle body side and that is provided with an insertion hole; an imaging unit that is supported at the supporting body so as to be capable of rotating, and that is capable of imaging; wiring that is inserted through the insertion hole and that extends out from a base end side of the insertion hole toward the vehicle body side; and a covering body that covers the supporting body at a leading end side of the insertion hole, that is capable of being abutted by the wiring, and that rotates together with the imaging unit.

An imaging device of a second aspect is the imaging device of the first aspect, further including a hook section that is capable of rotating together with the covering body and by which a part of the wiring that extends from the leading end side of the insertion hole is hooked.

An imaging device of a third aspect is the imaging device of the second aspect, wherein: an axial direction of the insertion hole is disposed so as to be inclined with respect to an up-down direction; and the wiring is hooked by the hook section at a position in the up-down direction between an upper edge and a lower edge of a leading end of the insertion hole.

An imaging device of a fourth aspect is the imaging device of any one of the first aspect to the third aspect, wherein the wiring is a plurality of wirings disposed on the covering body in a circumferential direction of the insertion hole.

An imaging device of a fifth aspect is the imaging device of the fourth aspect, further including a partition section that is capable of rotating together with the covering body and that partitions placement sections of the plurality of wirings from each other in the circumferential direction of the insertion hole.

An imaging device of a sixth aspect is the imaging device of any one of the first aspect to the fifth aspect, further including a restricting section that is provided at the covering body, and that is engaged at the imaging unit side so as to restrict displacement of the imaging unit in a radial direction of rotation of the imaging unit.

An imaging device of a seventh is the imaging device of any one of the first aspect to the sixth aspect, wherein: the covering body includes a supporting body leading end covering section that covers a leading end of the insertion hole of the supporting body, the supporting body leading end covering section being capable of integrally rotating with the imaging unit; and the wiring is inserted through the insertion hole such that the wiring is not abutted on the leading end of the insertion hole and the wiring is capable of being abutted on the supporting body leading end covering section.

In the imaging device of the first aspect, the imaging unit is supported, so as to be capable of rotating, by the supporting body provided at the vehicle body side, and the imaging unit is capable of imaging an image. The wiring is inserted through the insertion hole of the supporting body, and the wiring extends out from the base end side of the insertion hole toward the vehicle body side.

The supporting body at the leading end side of the insertion hole is covered by the covering body, the wiring is capable of abutting the covering body, and the covering body rotates together with (integrally rotates with) the imaging unit. Thus, even when the wiring is press-contacted onto the covering body, the covering body rotates together with the imaging unit when the imaging unit is rotated, thereby enabling the wiring to be suppressed from sliding on the covering body. This enables input of load to the wiring to be suppressed.

In the imaging device of the seventh aspect, the supporting body at the leading end of the insertion hole is covered by the supporting body leading end covering section, the wiring does not abut the leading end of the insertion hole and the wiring is capable of abutting the supporting body leading end covering section, and the supporting body leading end covering section rotates integrally with the imaging unit. Thus, even when the wiring is press-contacted onto the supporting body leading end covering section, the supporting body leading end covering section integrally rotates with the imaging unit when the imaging unit is rotated, thereby enabling the wiring to be suppressed from sliding on the supporting body leading end covering section. This enables input of load to the wiring to be suppressed.

In the imaging device of the second aspect, the hook section is capable of rotating together with the covering body, and a part of the wiring which part extends from the leading end side of the insertion hole is hooked by the hook section. This enables displacement of the hook section with respect to the covering body to be suppressed.

In the imaging device of the third aspect, the axial direction of the insertion hole is disposed inclined with respect to the up-down direction of the vehicle. This enables a projection amount of the wiring in the up-down direction from the leading end of the insertion hole to be made smaller, and enables the imaging device to be made more compact in the up-down direction.

Moreover, the wiring is hooked by the hook section at the up-down direction position between the upper edge and the lower edge of the leading end of the insertion hole. This enables the projection amount of the wiring in the up-down direction from the leading end of the insertion hole to be made even smaller, and enables the imaging device to be made even more compact in the up-down direction. This also enables an increase in the abutting pressure of the wiring to the covering body to be suppressed.

In the imaging device of the fourth aspect, the plural wirings are disposed on the covering body in the circumferential direction of the insertion hole. This enables the projection amount of the wirings from the leading end of the insertion hole in the axial direction of the insertion hole to be made smaller, and enables the imaging device to be made more compact in the axial direction of the insertion hole, in contrast to a case in which plural wirings are disposed on the covering body so as to be disposed in the axial direction of the insertion hole.

In the imaging device of the fifth aspect, the partition section is capable of rotating together with the covering body, and the partition section partitions placement sections of the plural wirings from each other in the circumferential direction of the insertion hole. This enables plural of the wirings to be suppressed from being displaced on the covering body so as to be disposed in the axial direction.

In the imaging device of the sixth aspect, the restricting section is provided at the covering body, and the restriction section is engaged at the imaging unit side so as to restrict displacement of the imaging unit in the radial direction of rotation of imaging unit. This enables displacement of the imaging unit to be suppressed, even when load is input at the imaging unit side.

BRIEF DESCRIPTION OF THE DRAWINGS

Exemplary embodiments will be described in detail with reference to the following figures, wherein.

DETAILED DESCRIPTION

First Exemplary Embodiment

Figure 1:
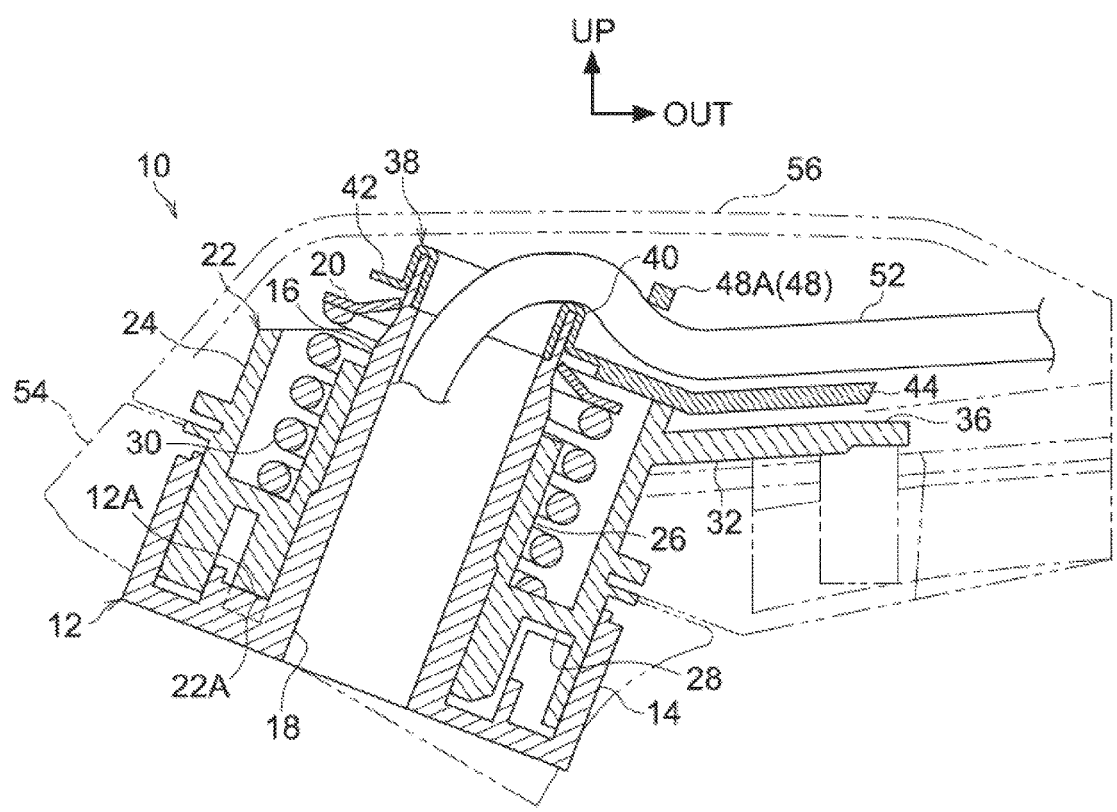
FIG. 1 is a cross-section illustrating an imaging device according to a first exemplary embodiment, as viewed from the vehicle rear.
Figure 2:
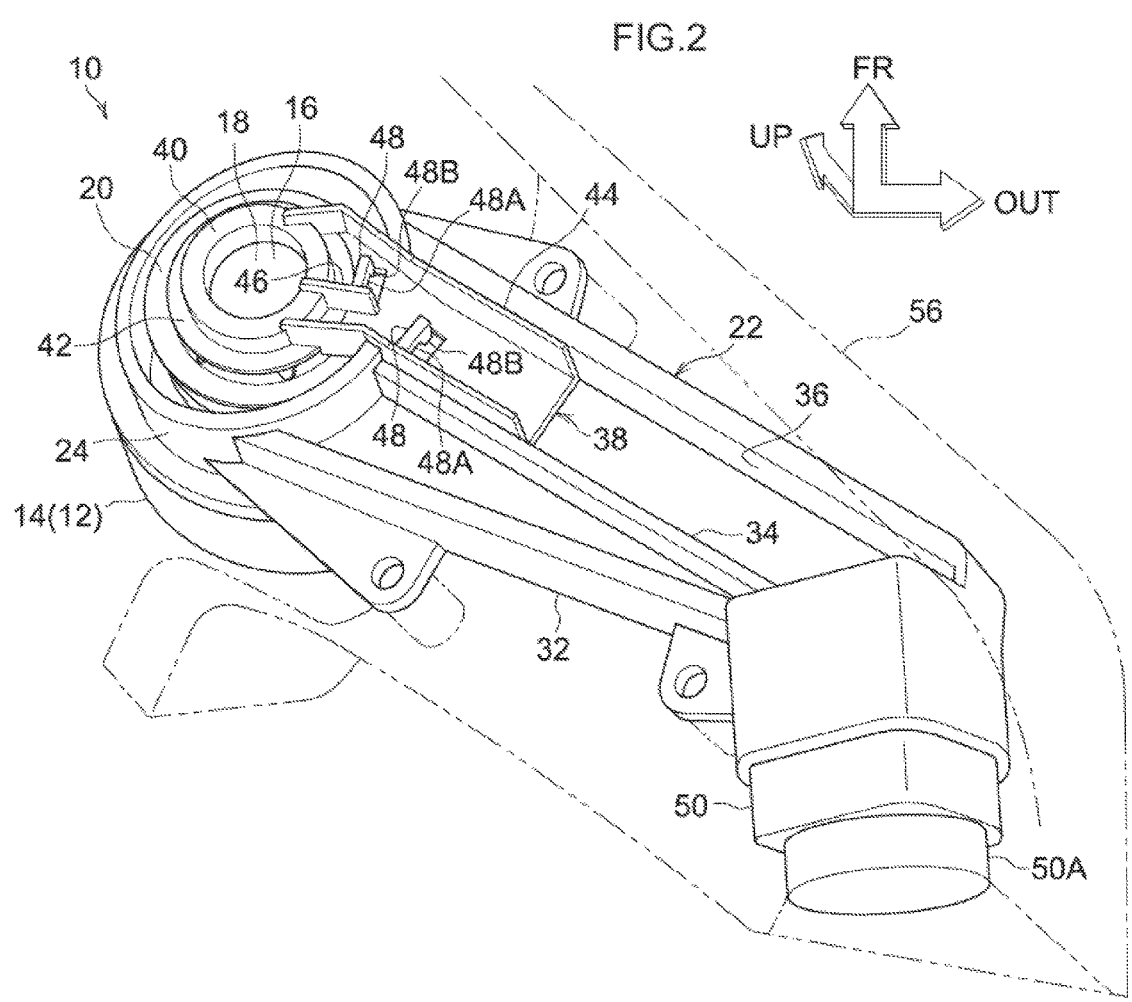
FIG. 2 is a perspective view illustrating an imaging device according to the first exemplary embodiment, as viewed diagonally from the vehicle upper rear.

FIG. 1 is a cross-section illustrating an imaging device 10 according to a first exemplary embodiment as viewed from the vehicle rear, and FIG. 2 is a perspective view illustrating the imaging device 10 as viewed diagonally from the vehicle upper rear. Note that in the drawings, the arrow FR indicates the vehicle front, the arrow OUT indicates the vehicle width direction outside (vehicle right), and the arrow UP indicates upward.

The imaging device 10 according to the present exemplary embodiment is installed at the outside of a vehicle front side end of an up-down direction intermediate portion of a side door (a front side door, not illustrated in the drawings), serving as a vehicle body side of a vehicle.

As illustrated in FIGS. 1 and 2, a base 12, made of metal (or may be made of resin) and serving as a supporting body, is provided at the imaging device 10. The imaging device 10 is installed to the side door by fixing the base 12 to the side door.

A bottomed, circular tube shaped outer supporting tube 14, configuring a supporting section, is provided at the base 12. The axial direction of the outer supporting tube 14 is inclined in a direction toward the vehicle width direction outside on progression upward, and the interior of the outer supporting tube 14 is open at the upper side. A circular tube shaped inner supporting tube 16, serving as an insertion section configuring the supporting section, is coaxially provided at inner side of the outer supporting tube 14. A lower end (base end) of the inner supporting tube 16 is integrated with a lower wall (bottom wall) of the outer supporting tube 14, and the inner supporting tube 16 projects out toward the upper side with respect to the outer supporting tube 14. A circular column shaped insertion hole 18 is configured at the inner side of the inner supporting tube 16, and the insertion hole 18 is open at the upper side and at the lower side of the base 12.

Plural engagement protrusions 12A, serving as engagement portion, are integrally provided at the lower wall of the outer supporting tube 14. The engagement protrusions 12A project out toward the upper side. The engagement protrusions 12A each have a trapezoidal shaped cross-section, and end faces of each engagement protrusion 12A at both sides in the circumferential direction of the base 12 (the circumferential directions of the outer supporting tube 14 and the inner supporting tube 16) are inclined in a downward direction on progression toward end portion sides of the engagement protrusion 12A in the circumferential direction of the base 12.

A substantially circular ring plate shaped bush nut 20, made of metal and serving as a stop member, is attached to an upper portion (leading end side portion) of the inner supporting tube 16. The bush nut 20 stops movement of the inner supporting tube 16 toward the upper side.

A bracket 22, made of metal (or may be made of resin) and serving as a rotation body, is supported by the base 12 so as to be capable of rotating (swinging) in the vehicle front-rear direction.

A circular tube shaped outer rotation tube 24, configuring a supported section, is provided at the bracket 22. A lower side portion of the outer rotation tube 24 is fitted inside the outer supporting tube 14 of the base 12, and the outer rotation tube 24 is supported by the outer supporting tube 14 so as to be capable of swinging (rotating) coaxially thereto. A circular tube shaped inner rotation tube 26, configuring the supported section, is coaxially provided inside the outer rotation tube 24. The inner supporting tube 16 of the base 12 is fitted into the interior of the inner rotation tube 26 in a state in which an upper end of the inner rotation tube 26 is arranged at the lower side of the bush nut 20 of the base 12, such that the inner rotation tube 26 is supported by the inner supporting tube 16 so as to be capable of swinging (rotating) coaxially thereto. A circular ring plate shaped connection plate 28 is coaxially provided between an axial direction intermediate portion of the outer rotation tube 24 and an axial direction intermediate portion of the inner rotation tube 26. The outer rotation tube 24 and the inner rotation tube 26 are connected together by the connection plate 28, and are capable of rotating integrally with each other.

Plural engagement recessed (concave) portions 22A, serving as engaged portions, are formed in a lower end portion of the inner rotation tube 26. The engagement recessed portion 22A is open at both radial direction sides and at the lower side of the inner rotation tube 26. The engagement recessed portions 22A each have a trapezoidal shaped cross-section. End faces of each engagement recessed portion 22A at both sides in the circumferential direction of inner rotation tube 26 are inclined in a downward direction on progression toward end portion sides of the engagement recessed portion 22A in the circumferential direction of the inner rotation tube 26. The engagement protrusions 12A of the base 12 (the lower wall of the outer supporting tube 14) are fitted into the engagement recessed portions 22A.

A spiral rod shaped coil spring 30, made of metal and serving as urging (energizing) section, spans between the bush nut 20 of the base 12 and the connection plate 28 of the bracket 22. The inner supporting tube 16 of the base 12 and the inner rotation tube 26 of the bracket 22 are coaxially disposed inside the coil spring 30. The coil spring 30 is compressed in its axial direction, urging (energizing) the connection plate 28 of the bracket 22 toward the lower side, due thereto that the engagement protrusions 12A of the base 12 are maintained fitted together with the engagement recessed portions 22A of the bracket 22, and rotating of the bracket 22 with respect to the base 12 is restricted. Rotating of the bracket 22 with respect to the base 12 is permitted when rotating force with respect to the base 12 acts on the bracket 22 and fitting together of the engagement protrusions 12A with the engagement recessed portions 22A is released while the bracket 22 is moved toward the upper side against the urging force of the coil spring 30.

An elongated plate shaped extension frame 32 with a U-shaped cross-section is provided as an extension section at the bracket 22. The inside of the extension frame 32 is open at the upper side. A base end (vehicle width direction inside end) of the extension frame 32 is integrated with the outer rotation tube 24 of the bracket 22. The extension frame 32 extends in a direction toward the vehicle rear side on progression toward the vehicle width direction outside, with a vehicle front-rear direction dimension (a width dimension of the extension frame 32) that gradually becomes smaller on progression toward the vehicle width direction outside. An elongated plate shaped dividing plate 34, serving as a dividing section, is provided inside the extension frame 32. The dividing plate 34 is integrated with a lower wall of the extension frame 32 and extends out toward the upper side. A base end (vehicle width direction inside end) of the dividing plate 34 is integrated with the outer rotation tube 24 of the bracket 22. The dividing plate 34 extends out parallel to a vehicle front side wall of the extension frame 32, and a leading end (vehicle width direction outside end) of the dividing plate 34 is integrated with a leading end portion (vehicle width direction outside end portion) of a vehicle rear side wall of the extension frame 32 (FIG. 2).

A routing (arranging) space 36 with a rectangular shaped cross-section is formed at the upper side of the lower wall of the extension frame 32, between the vehicle front side wall of the extension frame 32 and the dividing plate 34. The routing space 36 is open at the upper side, and is in communication with the inside of the outer rotation tube 24 of the bracket 22.

The upper side of the base 12 and the bracket 22 is covered by a harness cover 38, made of resin (or may be made of metal) and serving as a covering body. The harness cover 38 is fixed to the bracket 22 by fastening using screw or resiliently engaged using hook (not illustrated in the drawings), and is capable of moving integrally with the bracket 22.

A circular ring plate shaped covering frame 40, serving as a covering section (supporting body leading end covering section), is provided at the harness cover 38. A circumferential portion of the covering frame 40 has an inverted U-shaped cross-section. An upper end portion (leading end portion) of the inner supporting tube 16 of the base 12 is fitted into the circumferential portion of the covering frame 40, and the covering frame 40 covers the upper side and both radial direction sides of the upper end portion of the inner supporting tube 16. The covering frame 40 is disposed coaxially to the inner supporting tube 16 and is capable of moving with respect to the inner supporting tube 16. A flat plate shaped circular ring flange 42, serving as a reinforcing section, is integrally provided at an outer peripheral lower end of the covering frame 40. The flange 42 projects out toward the radial direction outside of the covering frame 40, reinforcing the covering frame 40.

An elongated plate shaped guide frame 44 with a U-shaped cross-section, serving as a guide section, is provided at the harness cover 38. The inside of the guide frame 44 is open at the upper side. A base end portion (vehicle width direction inside end portion) of the guide frame 44 is integrated with the covering frame 40 and the flange 42. The flange 42 configures a lower wall of the base end portion of the guide frame 44, and a vehicle front side wall and a vehicle rear side wall of the guide frame 44 project out at the upper side of the covering frame 40. The guide frame 44 extends out in a direction toward the vehicle rear side on progression toward the vehicle width direction outside, and the guide frame 44 is fitted into the routing space 36 of the bracket 22.

A substantially rectangular plate shaped partition plate 46, serving as a partition section, is provided inside the base end portion of the guide frame 44. The partition plate 46 is integrated with the lower wall (including the flange 42) of the guide frame 44, and projects out toward the upper side. A base end portion (vehicle width direction inside end portion) of the partition plate 46 is integrated with the covering frame 40, and the partition plate 46 projects out at the upper side of the covering frame 40. The partition plate 46 extends out toward the vehicle width direction outside, and the partition plate 46 partitions the inside of the guide frame 44 into a vehicle front side portion and a vehicle rear side portion.

A pair of clamps 48, each with an L-shaped rod shape and serving as a hook section, are provided inside the base end side portion of the guide frame 44. A main body portion 48A of one clamp 48 extends out from a leading end portion (vehicle width direction outside end portion) of the partition plate 46 toward the vehicle front side. A main body portion 48A of another clamp 48 extends out toward the vehicle front side from the vehicle rear side wall of the guide frame 44 in the vicinity of the vehicle width direction outside location of the partition plate 46. A leading end portion 48B of each clamp 48 projects out toward the lower side, and a gap is provided between the leading end portion 48B of each clamp 48 and the lower wall of the guide frame 44. A lower end of the main body portion 48A of the clamp 48 is arranged at the lower side with respect to an upper end (edge), which is at the vehicle width direction inside, of an upper end face (leading end face) of the inner supporting tube 16 of the base 12, and is arranged at the upper side with respect to a lower end (edge), which is at the vehicle width direction outside, of the upper end face of the inner supporting tube 16.

A camera 50, serving as an imaging unit, is fastened and fixed to a leading end portion (vehicle width direction outside end portion) of the bracket 22 (extension frame 32). A substantially circular column shaped lens portion 50A is provided at a vehicle rear side end portion of the camera 50. The lens portion 50A is exposed through and from a visor 56, described later, and the camera 50 is operated to image the vehicle rear side through the lens portion 50A.

A lamp (such as a turn indicator lamp, not illustrated in the drawings), serving as an additional mechanism, is fastened and fixed to the leading end portion of the bracket 22. A light-emitting portion (not illustrated in the drawings) is provided, as an exposed portion, at the lamp. The light-emitting portion is exposed through the visor 56, described later, and the lamp is operated so as to emit light from the light-emitting portion.

Harnesses 52 are electrically connected to the camera 50 and the lamp respectively. The harness 52 is a bundle of plural cables. The harnesses 52 are routed (arranged) inside the routing space 36 of the bracket 22, inside the guide frame 44 of the harness cover 38, at the upper side of a vehicle width direction outside portion of the covering frame 40, inside the covering frame 40 (at the radial direction inside of the covering frame 40), inside the inner supporting tube 16 (insertion hole 18) of the base 12, and inside the side door, and are electrically connected to a controller (not illustrated in the drawings) inside the vehicle. Thus, the camera 50 is operated under the control of the controller, and the lamp is also operated under the control of the controller.

One harness 52 is routed at the vehicle front side of the partition plate 46 of the harness cover 38. The one harness 52 is hooked down to the lower side by the main body portion 48A of the one (vehicle front side) clamp 48 of the harness cover 38, and is engaged in the vehicle front-rear direction between the leading end portion 48B of the one clamp 48 and the partition plate 46. Another harness 52 is routed at the vehicle rear side of the partition plate 46. The another harness 52 is hooked down to the lower side by the main body portion 48A of the another (vehicle rear side) clamp 48 of the harness cover 38, and is engaged in the vehicle front-rear direction between the leading end portion 48B of the another clamp 48 and the vehicle rear side wall of the guide frame 44.

The outer periphery of a lower side portion of the base 12 is covered by a bottomed, circular tube shaped base cover 54, made of resin and serving as a housing body, the base cover 54 inside is open at the lower side. The base cover 54 is fixed to the outer supporting tube 14 of the base 12, and the outer periphery of the outer rotation tube 24 of the bracket 22 pierces through an upper wall (bottom wall) of the base cover 54 so as to be capable of moving.

The elongated box shaped visor 56 (housing), made of resin and serving as a placement body, is provided at the upper side of the base cover 54. The visor 56 is fixed to the bracket 22 and is capable of moving integrally with the bracket 22. The outer periphery of the outer rotation tube 24 of the bracket 22 pierces through a lower wall of a base end portion (vehicle width direction inside end portion) of the visor 56. An upper wall of the base end portion of the visor 56 is disposed in the vicinity of the upper side location of an upper end of the covering frame 40 of the harness cover 38. The visor 56 houses the extension frame 32 of the bracket 22, the guide frame 44 of the harness cover 38, the camera 50, the lamp, the harnesses 52, and so on. The lens portion 50A of the camera 50 and the light-emitting portion of the lamp are exposed through the visor 56.

A monitor (not illustrated in the drawings), serving as a display unit, is electrically connected to the controller, and an images imaged by the camera 50 is displayed on the monitor under the control of the controller. The monitor is disposed inside a vehicle cabin, and visual recognition of the vehicle rear side by the occupant is assisted by the vehicle occupant checking image displayed on the monitor (image imaged by the camera 50).

Explanation follows regarding operation of the present exemplary embodiment. In the imaging device 10 with the above configuration, the bracket 22 is capable of rotating with respect to the base 12, and the camera 50 and the lamp are fastened and fixed to the leading end portion of the bracket 22. The harnesses 52 are electrically connected to the camera 50 and the lamp respectively, and the harnesses 52 are routed inside the routing space 36 of the bracket 22 and inside the inner supporting tube 16 (insertion hole 18) of the base 12. An upper side portion of the inner supporting tube 16 is housed inside the visor 56, the upper wall of the visor 56 is disposed in the vicinity of the upper side location of the upper end of the inner supporting tube 16, and the visor 56 is capable of rotating integrally with the bracket 22.

Note that the covering frame 40 of the harness cover 38 covers the upper end portion (the upper end) of the inner supporting tube 16, so, the harnesses 52 are abutted by the covering frame 40 (in the present exemplary embodiment, the harnesses 52 do not directly abut the upper end of the inner supporting tube 16) such that the harnesses 52 are restricted from abutting the upper end of the inner supporting tube 16, and the covering frame 40 (the harness cover 38) is capable of rotating integrally with the bracket 22. Thus, the harnesses 52 do not directly sliding on the upper end of the inner supporting tube 16 when the bracket 22 is rotated. Further, even though the harnesses 52 are press-contacted to the covering frame 40, the covering frame 40 rotates integrally with the bracket 22 when the bracket 22 is rotated, thereby enabling the harnesses 52 to be suppressed from sliding against the covering frame 40. This enables input of load to the harnesses 52 to be suppressed, enabling the harnesses 52 to be protected.

Moreover, even supposing the harnesses 52 are pressed toward the lower side by the upper wall of the visor 56 and the harnesses 52 are press-contacted by the covering frame 40, the harnesses 52 can be protected as described above. This enables the upper wall of the visor 56 to be disposed close to the upper end of the inner supporting tube 16, enables the height of the upper wall of the visor 56 to be made lower, enables the up-down direction (a direction perpendicular to the upper wall of the base end portion of the visor 56) dimension of the visor 56 to be made smaller, and enables the imaging device 10 to be made more compact in the up-down direction.

The axial directions of the inner supporting tube 16 and the covering frame 40 are inclined in a direction toward the vehicle width direction outside on progression upward, such that a vehicle width direction outside portion of the upper end of the inner supporting tube 16 is disposed at the lower side than a vehicle width direction inside portion of the upper end of the inner supporting tube 16, and a vehicle width direction outside portion of the upper end of the covering frame 40 is disposed at the lower side than a vehicle width direction inside portion of the upper end of the covering frame 40. Thus, routing (arranging) the harnesses 52 at the upper side of the vehicle width direction outside portions of the upper ends of the inner supporting tube 16 and the covering frame 40 enables a projection amount of the harnesses 52 toward the upper side with respect to the inner supporting tube 16 and the covering frame 40 to be made smaller. This enables the height of the upper wall of the visor 56 to be made even lower, enables the up-down direction dimension of the visor 56 to be made even smaller, and enables the imaging device 10 to be made even more compact in the up-down direction.

The clamps 48 are provided at the harness cover 38, and the harnesses 52 routed (arranged) at the upper side of the covering frame 40 are hooked by the clamps 48. This enables displacement of the harnesses 52 with respect to the harness cover 38 and the bracket 22 to be restricted.

The lower end of the main body portion 48A of the clamp 48 is disposed at the lower side than the upper edge which is at the vehicle width direction inside of the upper end face of the inner supporting tube 16. Thus, the projection amount of the harnesses 52 toward the upper side with respect to the inner supporting tube 16 and the covering frame 40 can be made even smaller by the harness 52 being hooked down so as to be positioned below the main body portion 48A of the clamp 48. This enables the height of the upper wall of the visor 56 to be made even lower, enables the up-down direction dimension of the visor 56 to be made even smaller, and enables the imaging device 10 to be made even more compact in the up-down direction.

The lower end of the main body portion 48A of the clamp 48 is disposed at the upper side than the lower edge which is at the vehicle width direction outside of the upper end face of the inner supporting tube 16. This enables the abutting pressure of the harness 52 to the covering frame 40 to be suppressed from becoming excessively high, even though the harness 52 is hooked down so as to be positioned below the main body portion 48A of the clamps 48.

In the harness cover 38, the partition plate 46 projects out at the upper side of the covering frame 40, the one harness 52 is routed at the vehicle front side of the partition plate 46, and the another harness 52 is routed at the vehicle rear side of the partition plate 46. Thus, the pair of harnesses 52 are routed at the upper side of the covering frame 40 in a state separated from each other in the circumferential direction of the covering frame 40. This enables the pair of harnesses 52 to be restricted by the partition plate 46 from being routed (arranged) overlapping each other in the axial direction of the covering frame 40 at the upper side of the covering frame 40, thereby enabling the projection amount of the pair of harnesses 52 toward the upper side with respect to the covering frame 40 to be made smaller. This enables the height of the upper wall of the visor 56 to be made even lower, enables the up-down direction dimension of the visor 56 to be made even smaller, and enables the imaging device 10 to be made even more compact in the up-down direction.

Second Exemplary Embodiment

Figure 3:
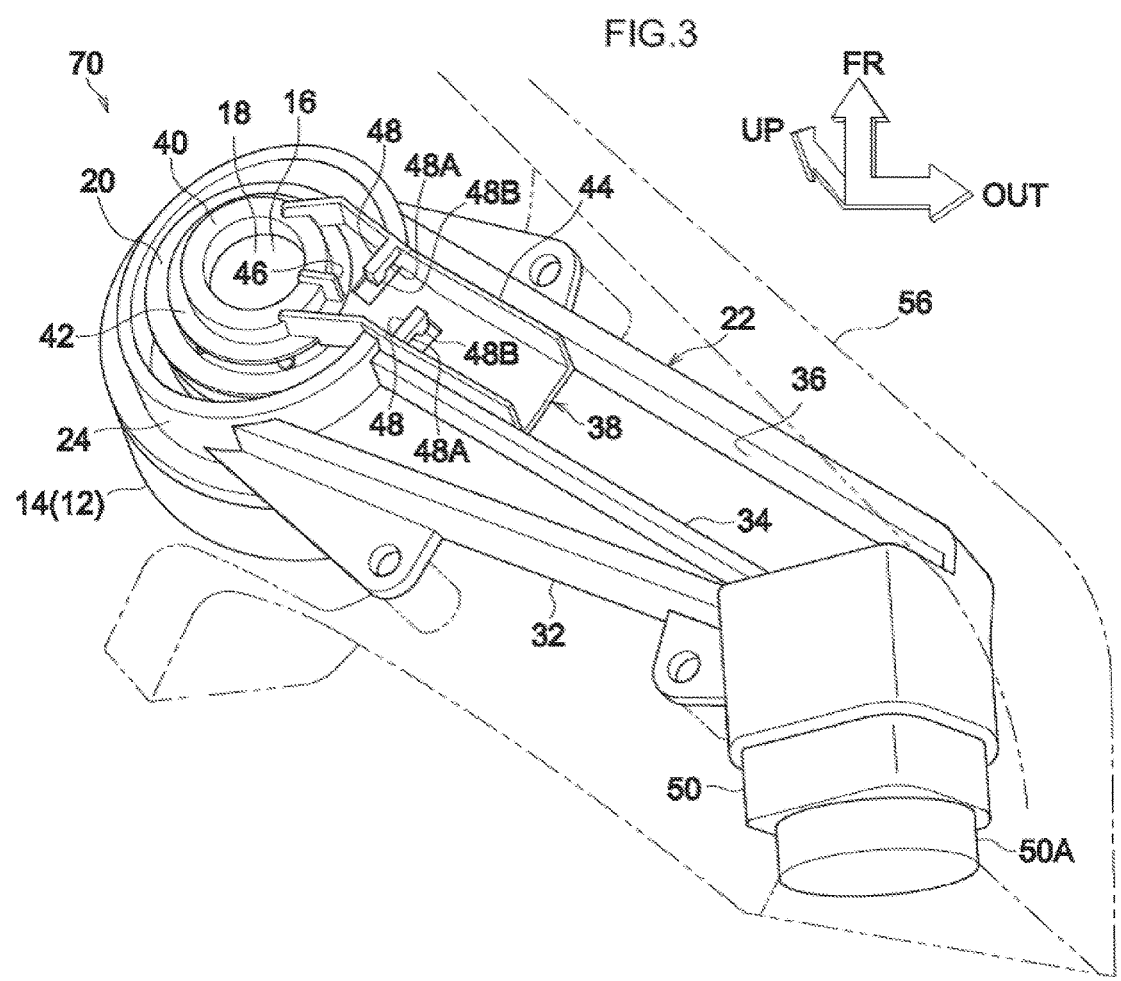
FIG. 3 is a perspective view illustrating an imaging device according to a second exemplary embodiment, as viewed diagonally from the vehicle upper rear.

FIG. 3 is a perspective view illustrating an imaging device 70 according to a second exemplary embodiment, as viewed diagonally from the vehicle upper rear.

The imaging device 70 according to the present exemplary embodiment has basically the same configuration as that in the first exemplary embodiment, but differs therefrom regarding the following points.

As illustrated in FIG. 3, in the harness cover 38 of the imaging device 70 according to the present exemplary embodiment, the main body portion 48A of the one (vehicle front side) clamp 48 extends out from the vehicle front side wall of the guide frame 44 toward the vehicle rear side. The partition plate 46 extends out from the covering frame 40 as far as the vehicle width direction inside location with respect to the one clamp 48. The one (vehicle front side) harness 52 is hooked down to the lower side by the main body portion 48A of the one clamp 48, and is engaged in the vehicle front-rear direction between the leading end portion 48B of the one clamp 48 and the vehicle front side wall of the guide frame 44.

Note that the present exemplary embodiment enables similar operation and advantageous effects as those in the first exemplary embodiment to be exhibited.

Third Exemplary Embodiment

Figure 4:
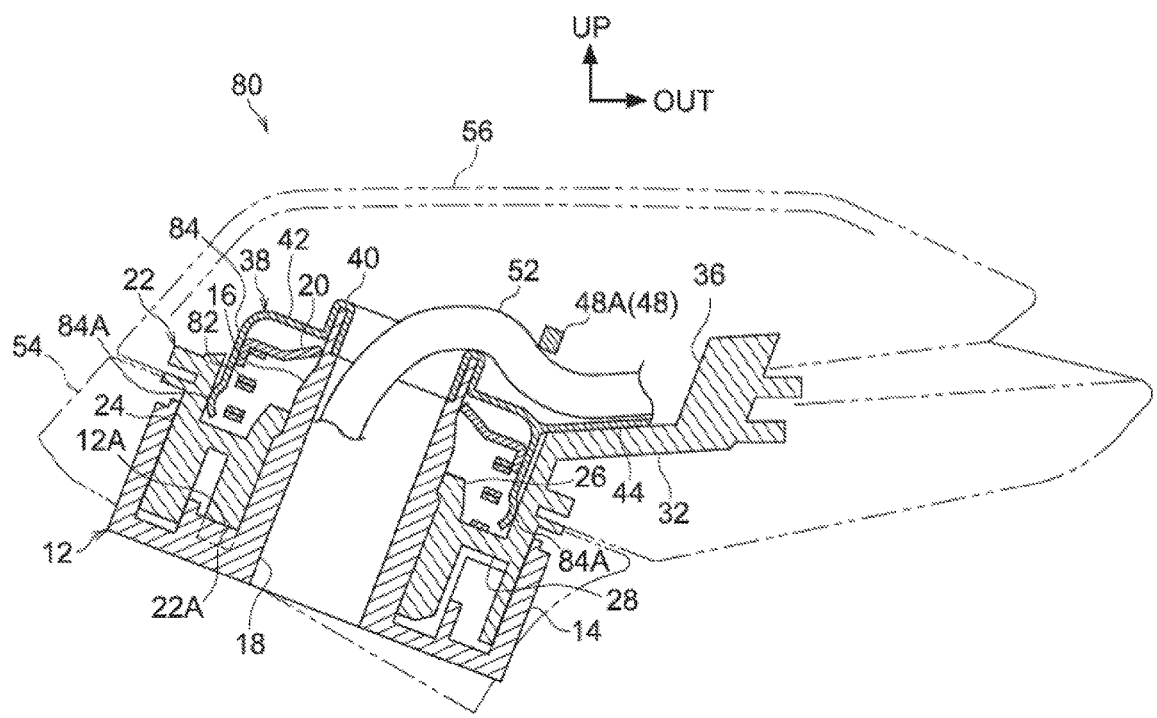
FIG. 4 is a cross-section illustrating an imaging device according to a third exemplary embodiment, as viewed from the vehicle rear.

FIG. 4 is a cross-section illustrating an imaging device 80 according to a third exemplary embodiment of the present invention, as viewed from the vehicle rear.

The imaging device 80 according to the present exemplary embodiment has basically the same configuration as that in the first exemplary embodiment and second exemplary embodiment, but differs therefrom regarding the following points.

As illustrated in FIG. 4, in the base 12 of the imaging device 80 according to the present exemplary embodiment, the inner supporting tube 16 is set with a smaller axial direction dimension, and the inner supporting tube 16 is set with a smaller projection amount toward the upper side with respect to the outer supporting tube 14.

In the bracket 22, the outer rotation tube 24 and the inner rotation tube 26 are set with smaller axial direction dimensions, and the inner rotation tube 26 is set with a smaller fitting amount into the inner supporting tube 16 of the base 12 in the axial direction thereof.

Figure 5:
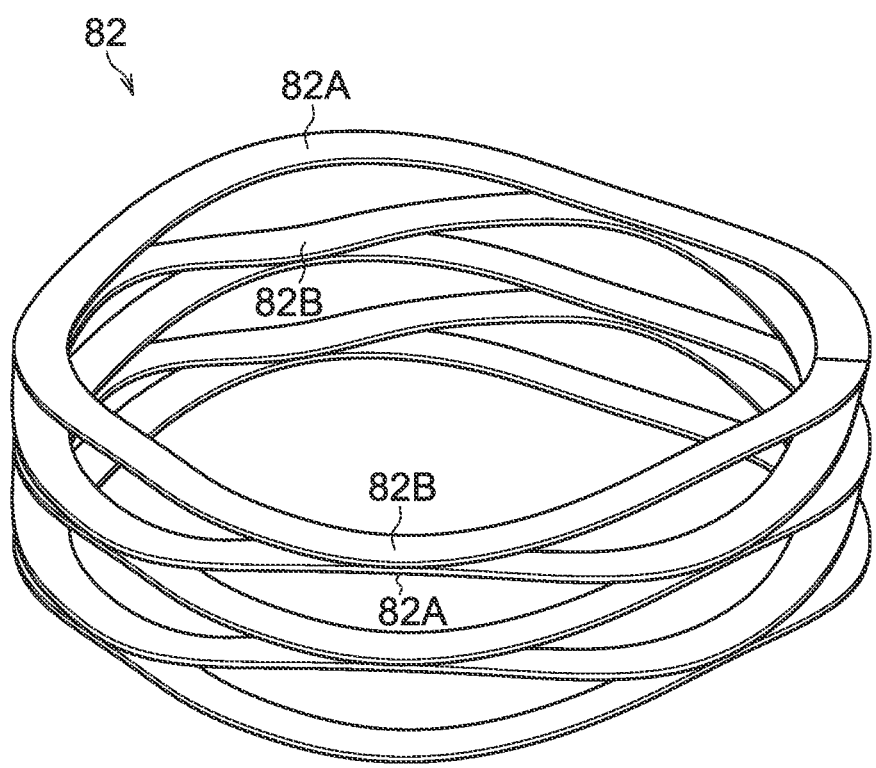
FIG. 5 is a perspective view illustrating a wave spring of an imaging device according to the third exemplary embodiment.

Instead of the coil spring 30, a spiral plate shaped wave spring 82 (see FIG. 5), made of metal and serving as the urging (energizing), spans between the bush nut 20 of the base 12 and the connection plate 28 of the bracket 22. The inner supporting tube 16 of the base 12 and the inner rotation tube 26 of the bracket 22 are coaxially disposed inside the wave spring 82. The wave spring 82 is set with a smaller axial direction dimension than the coil spring 30. The wave spring 82 is compressed in the axial direction and urges the connection plate 28 of the bracket 22 toward the lower side.

The wave spring 82 is gently curved in a wave shape along its length direction. The wave spring 82 is formed with alternating wave convex portions (wave crest portions) 82A and wave reverse-convex portions (wave trough portions) 82B along its length direction. The wave convex portions 82A project out toward one axial direction side (the upper side) of the wave spring 82, and the wave reverse-convex portions 82B project out toward another axial direction side (the lower side) of the wave spring 82. The wave convex portion 82A at the one axial direction side of the wave spring 82 and the wave reverse-convex portion 82B at the another axial direction side of the wave spring 82 are provided adjacent to each other in a state separated in the axial direction of the wave spring 82, and the wave reverse-convex portion 82B at the one axial direction side of the wave spring 82 and the wave convex portion 82A at the another axial direction side of the wave spring 82 are provided adjacent to each other such that projection leading end portions thereof overlap with each other in the axial direction of the wave spring 82. Plural overlapping portions of the wave reverse-convex portions 82B and the wave convex portions 82A are provided at equal spacings therebetween to each other along the circumferential direction of the wave spring 82, and the overlapping portions of the wave reverse-convex portions 82B and the wave convex portions 82A at each of the circumferential direction positions of the wave spring 82 are provided adjacent to each other in a state separated from each other in the axial direction of the wave spring 82. Thus, the wave spring 82 generates equivalent urging force to that of the coil spring 30, even though the axial direction dimension of the wave spring 82 is set smaller than that of the coil spring 30, as described above.

In the harness cover 38, the flange 42 is set with a large outer diameter, and a circular tube shaped restriction tube 84, serving as a restriction section, is integrally provided at the outer periphery of the flange 42. The restriction tube 84 projects out toward the lower side, and the restriction tube 84 is coaxially inserted inside the outer rotation tube 24 of the bracket 22. Plural restricting protrusions 84A, serving as abutting portion, are formed at a lower end portion of the restriction tube 84. The plural restricting protrusions 84A are disposed at equal spacings therebetween around the circumferential direction of the restriction tube 84, and each curve in a protruding shape toward the radial direction outside of the restriction tube 84. The restricting protrusions 84A engage with (resiliently abut) an inner peripheral face of the outer rotation tube 24. Thus, displacement of the bracket 22 (outer rotation tube 24) with respect to the base 12 (inner supporting tube 16) in the radial direction of rotation of the bracket 22 (outer rotation tube 24) is restricted via the harness cover 38, and tilting of the bracket 22 with respect to the base 12 (tilting of the inner rotation tube 26 with respect to the inner supporting tube 16 and tilting of the outer rotation tube 24 with respect to the outer supporting tube 14) is restricted.

Note that the present exemplary embodiment also enables similar operation and advantageous effects as those in the first exemplary embodiment and second exemplary embodiment to be exhibited.

By setting the wave spring 82 with a smaller axial direction dimension than the coil spring 30, the inner supporting tube 16 of the base 12 is set with a smaller axial direction dimension, and the outer rotation tube 24 and the inner rotation tube 26 of the bracket 22 are also set with smaller axial direction dimensions. This enables the height of the upper wall of the visor 56 to be made even lower, enables the up-down direction dimension of the visor 56 to be made even smaller, and enables the imaging device 10 to be even more compact in the up-down direction.

The restricting protrusions 84A of the restriction tube 84 of the harness cover 38 are engaged with the inner peripheral face of the outer rotation tube 24, and displacement of the bracket 22 with respect to the base 12 in a radial direction of the rotation is restricted by the harness cover 38. This enables tilting of the bracket 22 with respect to the base 12 to be restricted by the harness cover 38, even though the inner supporting tube 16 and the inner rotation tube 26 are set with smaller axial direction dimensions as described above, and there is only a small fitting amount of the inner supporting tube 16 with the inner rotation tube 26 in the axial direction. This enables rattling of the bracket 22 against the base 12 while the vehicle is running and so on to be suppressed, and enables images imaged by the camera 50 to be suppressed from being blurred. Moreover, the support strength of the bracket 22 by the base 12 can be improved, and the strength of the imaging device 80 against load input from the exterior of the bracket 22 can be improved.

Note that in the present exemplary embodiment, the restriction tube 84 is provided with plural restricting protrusions 84A. However, a single restricting protrusion 84A may be provided continuously around the entire circumferential direction of the restriction tube 84.

In the present exemplary embodiment, the restriction tube 84 (including the restricting protrusions 84A) is integrally provided to the harness cover 38. However, the restriction tube 84 (including the restricting protrusions 84A) may be integrally provided to the bush nut 20.

In the first exemplary embodiment to the third exemplary embodiment described above, the partition plate 46 and the clamps 48 are provided at the harness cover 38. However, at least one of the partition plate 46 or the clamps 48 may be provided at the bracket 22.

In the first exemplary embodiment to the third exemplary embodiment described above, the harnesses 52 are provided as a pair. However, one, or three or more, harnesses 52 may be provided. In such cases, the number of partition plates 46 and clamps 48 may be changed so as to correspond to the number of harnesses 52.

In the first exemplary embodiment to the third exemplary embodiment described above, the camera 50 is capable of imaging the vehicle rear side. However, the camera 50 may be configured capable of imaging another direction (such as the lower side, upper side, vehicle direction inside, vehicle direction outside, or vehicle front side).

In the first exemplary embodiment to the third exemplary embodiment described above, the imaging device 10, 70, 80 is installed to a side door of the vehicle. However, the imaging device 10, 70, 80 may be installed to a section other than the side door of the vehicle.

What is claimed is:

1. An imaging device comprising:
a supporting body that is provided at a vehicle body side so as to protrude from the vehicle body side, the supporting body having a base end and a leading end in a protruding up-down direction between an upper edge and a lower edge of the leading end of the supporting body.

2. The imaging device of claim 1, further comprising the hook section that is configured to rotate together with the covering body and by which a portion of the wiring that extends from the leading end side opening of the insertion hole is hooked.

3. The imaging device of claim 1, wherein the wiring is a plurality of wirings disposed on the covering body in a circumferential direction of the insertion hole.

4. The imaging device of claim 2, wherein the wiring is a plurality of wirings disposed on the covering body in a circumferential direction of the insertion hole.

5. The imaging device of claim 1, wherein the wiring is a plurality of wirings disposed on the covering body in a circumferential direction of the insertion hole.

6. The imaging device of claim 3, further comprising a partition section that is configured to rotate together with the covering body and that partitions placement sections of the plurality of wirings from each other in the circumferential direction of the insertion hole.

7. The imaging device of claim 1, further comprising a restricting section that is provided at the covering body, and that is engaged at the imaging unit side so as to restrict displacement of the imaging unit in a radial direction of rotation of the imaging unit.

8. The imaging device of claim 1, wherein:
the wiring is inserted through the insertion hole such that the wiring is not abutted on the leading end of the supporting body.

9. The imaging device of claim 2, wherein:
the wiring is inserted through the insertion hole such that the wiring is not abutted on the leading end of the supporting body.

10. The imaging device of claim 1, wherein:
the wiring is inserted through the insertion hole such that the wiring is not abutted on the leading end of the supporting body.

11. The imaging device of claim 1, wherein:
the supporting body leading end covering section is fitted to the leading end of the supporting body so as to be rotatable such that the supporting body leading end covering section covers the leading end of the supporting body.

12. The imaging device of claim 1, wherein:
a covering section insertion hole is formed at the supporting body leading end covering section, the wire being inserted through the insertion hole and the covering section insertion hole.

13. The imaging device of claim 1, wherein the insertion hole is circular, and has a same cross-sectional area along its longitudinal axis.

14. The imaging device of claim 1, wherein the imaging unit includes:
an imaging section that is configured to image, and to which the wiring, extending out from the leading side opening of the insertion hole, is electrically connected, and
a rotation body to which the imaging section is fixed, and that is rotatably supported at the supporting body coaxially to the supporting body,
wherein the covering body is fixed to the rotation body such that the covering body and the supporting body leading end covering section are configured to rotate integrally with the imaging section.

\* \* \* \* \*

UNITED STATES PATENT AND TRADEMARK OFFICE
CERTIFICATE OF CORRECTION

PATENT NO. : 10,277,784 B2
APPLICATION NO. : 15/241571
DATED : April 30, 2019
INVENTOR(S) : Masahide Inayama and Toshinari Nakai It is certified that error appears in the above-identified patent and that said Letters Patent is hereby corrected as shown below:

In the Claims

Claim one should read:
1. An imaging device comprising:
a supporting body that is provided at a vehicle body side so as to protrude from the vehicle body side, the supporting body having a base end and a leading end in a protruding direction of the supporting body, and the base end being fixed to the vehicle body side, the supporting body having a tubular shape such that an insertion hole is formed around an interior of the supporting body and the insertion hole is open at a leading end side and a base end side of the supporting body;
an imaging unit that is supported at the supporting body, that is configured to rotate, and that is configured to image;
wiring that is electrically connected to the imaging unit, that is inserted through the insertion hole and that extends out from a base end side opening of the insertion hole, which is at the base end side of the supporting body, toward the vehicle body side; and
a covering body on which the wiring is disposed, and that rotates together with the imaging unit, wherein the covering body includes a supporting body leading end covering section that covers the leading end of the supporting body at the insertion hole such that the wiring extends out from a leading end side opening of the insertion hole, which is at the leading end side of the supporting body, that is configured to be abutted by the wiring, and that is configured to rotate integrally with the imaging unit, and
the supporting body leading end covering section covers the leading end of the supporting body such that the supporting body leading end covering section is arranged between a part of the wiring which part is in the vicinity of the leading end of the supporting body, and the leading end of the supporting body.

Signed and Sealed this
Seventeenth Day of September, 2019

Andrei Iancu
*Director of the United States Patent and Trademark Office*